United States Patent [19]
Hayashi

[11] Patent Number: 5,751,085
[45] Date of Patent: May 12, 1998

[54] AXIAL GAP TYPE ELECTRIC MOTOR WITH DYNAMIC PRESSURE AIR BEARING

[75] Inventor: Kunio Hayashi, Konan, Japan

[73] Assignee: Kabushiki Kaisha Toshiba, Kawasaki, Japan

[21] Appl. No.: 504,190

[22] Filed: Jul. 19, 1995

[30] Foreign Application Priority Data

Jul. 19, 1994 [JP] Japan ................... 6-166819

[51] Int. Cl.$^6$ ............... H02K 5/16; H02K 1/04; H02K 7/09; H02K 7/00
[52] U.S. Cl. ............... 310/90; 310/43; 310/90.5; 310/189; 310/198; 310/254; 310/268; 310/67 R
[58] Field of Search ................... 310/90, 67 R, 310/90.5, 189, 198, 268, 266, 254, 43; 384/107, 115

[56] References Cited

U.S. PATENT DOCUMENTS

| | | | |
|---|---|---|---|
| 4,181,867 | 1/1980 | Muller | 310/156 |
| 4,820,949 | 4/1989 | Mizobuchi et al. | 310/90 |
| 4,998,033 | 3/1991 | Hisabe et al. | 310/67 R |
| 5,089,732 | 2/1992 | Konno et al. | 310/67 R |
| 5,103,335 | 4/1992 | Sugiura | 359/212 |
| 5,172,021 | 12/1992 | Takahashi et al. | 310/90.5 |
| 5,370,463 | 12/1994 | Asada et al. | 384/113 |
| 5,434,695 | 7/1995 | Saito et al. | 359/200 |
| 5,453,650 | 9/1995 | Hashimoto et al. | 310/268 |
| 5,493,161 | 2/1996 | Uno et al. | 310/156 |
| 5,498,919 | 3/1996 | Bahn | 310/268 |
| 5,559,382 | 9/1996 | Oku et al. | 310/90 |
| 5,561,335 | 10/1996 | Dunfield et al. | 310/90.5 |
| 5,623,382 | 4/1997 | Moritan et al. | 360/99.08 |

FOREIGN PATENT DOCUMENTS

| | | |
|---|---|---|
| 62-23354 | 1/1987 | Japan. |
| 62-70811 | 4/1987 | Japan. |
| 6311698 | 11/1994 | Japan. |

*Primary Examiner*—Steven L. Stephan
*Assistant Examiner*—Michael J. Wallace, Jr.
*Attorney, Agent, or Firm*—Cushman Darby & Cushman IP Group of Pillsbury Madison & Sutro LLP

[57] ABSTRACT

An axial gap type electric motor includes a stator assembly having a plurality of stator coils fixed to a circuit board and a rotor assembly having a rotor magnet supported via a dynamic pressure gas bearing on the stator assembly. The stator coils are enclosed by a molding material into a single block. An upper face of the block opposed to the rotor magnet is rendered flat. Since the block of the stator coils has no irregularities that cause turbulent flows of air, flows of air flowing through a gap between the rotor magnet and the stator coils are rendered laminar. Consequently, windage loss can be reduced.

4 Claims, 13 Drawing Sheets

AXIAL GAP TYPE ELECTRIC MOTOR WITH DYNAMIC PRESSURE AIR BEARING

BACKGROUND OF THE INVENTION

1. Field of the Invention

This invention relates to electric motors which are required to rotate at high speeds, such as a scanner motor for driving a polygon mirror, and more particularly to an axial gap type electric motor having a dynamic pressure gas bearing.

2. Description of the Prior Art

Figure 13:
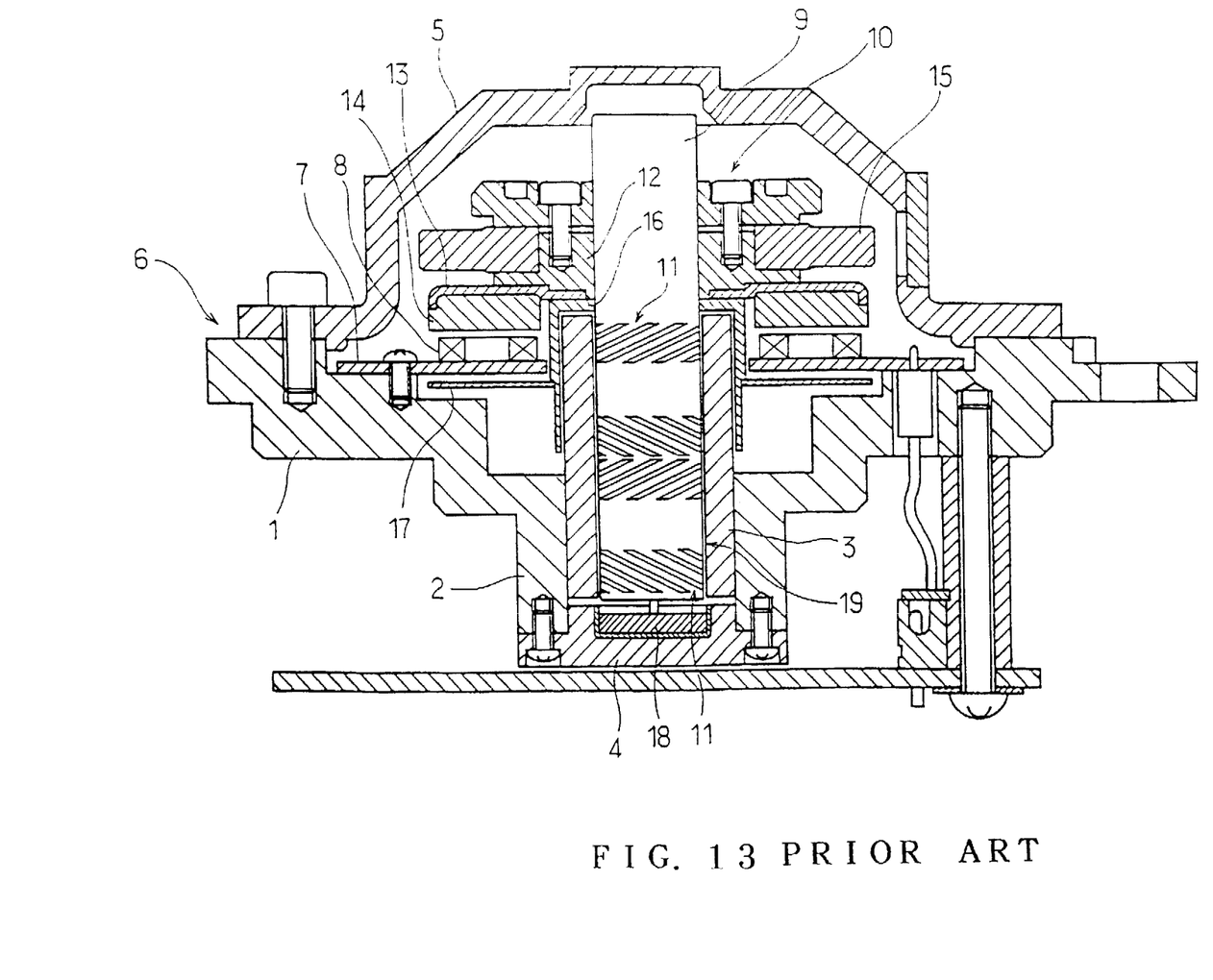
FIG. 13 is a longitudinal section of a prior art axial gap type electric motor.

Axial gap type electric motors are provided with dynamic pressure air bearing means in which air is used as a lubricating fluid. These axial gap type motors are used as scanner motors for driving polygon mirrors which are employed for scanning laser beams in laser beam printers. FIG. 13 illustrates such a conventional axial gap type electric motor used for driving a polygon mirror. A base 1 of the motor has a plurality of stepped portions on the upper face thereof and a cylindrical portion 2 formed in the central bottom thereof. A bearing cylinder 3 is inserted in the cylindrical portion 2 to be fixed in position by an adhesive agent. A bottom lid 4 is screwed to the bottom of the cylindrical portion 2. A cover 5 is screwed to the upper side of the base 1 so as to cover the bearing cylinder 3. The base 1 and the cover 5 constitute an enclosed motor casing 6. An electric circuit board 7 is screwed to an upper portion of the base 1 in the motor casing 6. A plurality of stator coils 8 are fixed to the upper face of the circuit board 7 by an adhesive agent.

A rotor assembly 10 including a rotational shaft 9 is provided in the motor casing 6. The rotational shaft 9 is rotatably inserted in the bearing cylinder 3 to be held therein. The rotational shaft 9 and the bearing cylinder 3 constitute dynamic pressure air bearing means. Two pairs of herringbone grooves 11, which compose part of the dynamic pressure air bearing means, are formed in the outer circumferential face of the rotational shaft 9.

A flange 12 is fixed to the upper portion of the rotational shaft 9. A rotor yoke 13 is fixed to the flange 12 by an adhesive agent. An annular rotor magnet 14 is fixed to the underside of the rotor yoke 13 by an adhesive agent. The rotor magnet 14 is disposed to be opposite to the stator coils 8 with a predetermined axial gap therebetween. A polygon mirror 15 is mounted to the flange 12.

A mounting member 16 is mounted to the underside of the flange 12 so as to be rotated with the rotational shaft 9. The mounting member 16 extends through the circuit board 7 so as to cover the bearing cylinder 3 from above the same. A magnetically focusing rotating yoke 17 is fixed to the lower portion of the mounting member 16 so as to be positioned under the circuit board 7. The rotating yoke 17 is disposed to be opposite to the rotor magnet 14 with the circuit board 7 and the stator coils 8 being interposed therebetween so that magnetic fluxes generated by the rotor magnet 14 pass through the rotating yoke 17. A sliding thrust receiving member 18 comprising a sliding bearing is provided on the inside of the bottom lid 4. A thrust load of the rotor assembly 10 is received by the sliding thrust receiving member 18.

Upon rotation of the rotor assembly 10, the herringbone grooves 11 draw air into a bearing gap of several micrometers in width defined between the inner circumferential face of the bearing cylinder 3 and the outer circumferential face of the rotational shaft 9, whereupon high dynamic pressure serving as dynamic pressure air bearing is produced. The rotational shaft 9 is rotated without contact with the bearing cylinder 3 by the action of the established dynamic pressure air bearing. Electric motors employing the dynamic pressure air bearing as described above are suitable for high speed rotation.

The axial gap type motors with the above-described dynamic pressure air bearing have the following problem. The motors of the type as described above are used in a high speed range (10,000 rpm or above, for example) in many cases. With rotation at a high speed, windage loss results from turbulent and laminar flows of air around the rotor assembly 10 as a body of rotation. In particular, irregularities of the stator coils 8 fixed to the circuit board 7 cause turbulent flows of air in a space between the stator coils 8 and the rotor magnet 14 disposed to be opposite to the stator coils 8 with the gap therebetween. These turbulent flows of air result in a large windage loss. The windage loss increases a rated input current of the motor, which increases a motor temperature. The increase in the motor temperature deteriorates the motor characteristics such as speed variation and the bearing characteristics such as shaft deflection. Deterioration of these characteristics is undesirable for the scanner motor driving the polygon mirror.

Furthermore, thrust bearing means receiving thrust load of the rotor assembly 10 is constituted by a sliding thrust receiving member 18 into a structure of sliding bearing. Accordingly, the life of the thrust bearing is shortened by the increase in the motor temperature. It is considered that a lubricating oil be employed for improvement of the life of the thrust bearing. In this case, however, an oil mist would adhere to the mirror surfaces of the polygon mirror 15, reducing the reflectance thereof.

SUMMARY OF THE INVENTION

Therefore, an object of the present invention is to provide an axial gap type electric motor wherein the windage loss caused around the stator coils can be reduced.

Another object of the invention is to provide an axial gap type electric motor wherein the increase of the motor temperature can be restrained so that the motor characteristics and the bearing characteristics can be improved.

Further another object of the invention is to provide an axial gap type electric motor wherein the life of thrust bearing means can be improved.

Further another object of the invention is to provide an axial gap type electric motor which can prevent the reflectance of the polygon mirror from being reduced and provide high-precision high-performance scanning when applied to a scanner motor for driving the polygon mirror.

To achieve these objects, the present invention provides an axial gap type electric motor comprising a stator assembly including a base having a bearing cylinder, an electric circuit board fixed to the base, and a plurality of stator coils annularly disposed on the circuit board, a rotor assembly including a rotational shaft rotatably inserted in and held by the bearing cylinder, a rotor magnet provided on the rotational shaft so as to be opposite to the stator coils with an axial gap therebetween, and a magnetic focusing rotating yoke provided so as to be rotated with the rotational shaft, the rotating yoke being disposed to be opposite to the rotor magnet with the circuit board and the stator coils being located therebetween, dynamic pressure gas bearing means provided between an outer circumferential face of the rotational shaft and an inner circumferential face of the bearing cylinder, and thrust bearing means for receiving thrust load of the rotor assembly. The annularly disposed stator coils are enclosed in a nonmagnetic molding material so that a single annular block conforming in configuration to the annularly disposed stator coils is formed. The annular block has a surface which is opposite to the rotor magnet and is rendered flat substantially over an entire area thereof such that the surface is prevented from being circumferentially rugged. The annular block is fixed to the circuit board so as to project from a surface thereof.

According to the above-described axial gap type motor, the stator coils are molded into a single block, which has a flat surface opposite to the rotor magnet. Accordingly, since the stator coils have no irregularities that cause the turbulent flows of air during rotation of the rotor assembly, flows of air flowing between the rotor magnet and the stator coils can be rendered laminar. Consequently, the windage loss can be reduced.

The reduction in the windage loss reduces the motor rating input current, whereby the rise in the motor temperature can be restrained. With this, the motor characteristics such as the motor speed variation and the bearing characteristics such as the shaft deflection can be improved, whereby a high precision motor can be provided.

In the above-described motor, a dynamic pressure thrust receiving member may be provided on the surface of the block opposite to the rotor assembly. The dynamic pressure thrust receiving member preferably has a spiral groove formed in a surface thereof for the dynamic pressure gas bearing, and the thrust bearing means comprises the dynamic pressure thrust receiving member and the rotor magnet. Alternatively, the rotor magnet may have a face opposed to the block of the stator coils and formed with a spiral groove. An amount of wear in the thrust bearing means is exceedingly small in the motor with the thrust bearing means constituted by the dynamic pressure gas bearing. Consequently, the life of the bearing can be rendered longer.

The motor may further comprises magnetically levitating means comprising an annular, stator side magnetically levitating magnet provided on the stator assembly and an annular, rotor side magnetically levitating magnet which is provided on the rotor assembly so as to be opposed to an inner or outer circumference of the stator side magnetically levitating magnet with a predetermined gap therebetween, the magnetically levitating means axially levitating the rotor assembly by magnetic repulsion between the stator and rotor side magnetically levitating magnets. The dynamic pressure gas bearing means may include two herringbone grooves formed in an outer circumferential face of the rotational shaft, and one of the herringbone grooves preferably has an axial dimension larger than the other herringbone groove so that during rotation of the rotor assembly, a force is generated which descends the rotor assembly toward the side of the stator assembly. Alternatively, the magnetic focusing rotating yoke may have a face opposed to the rotor magnet and formed with a spiral groove for the purpose of dynamic pressure gas bearing so that during rotation of the rotor assembly, a thrust is generated which descends the rotor assembly toward the side of the stator assembly.

As the result of the above-described construction, a rotating portion and a fixed portion of the thrust bearing means can be normally maintained in a non-contact condition. Consequently, the life of the bearing can be further lengthened and a starting current can be reduced. Furthermore, the provision of the descending force generating means can restrain the axial movement of the rotor assembly during its rotation, thereby reducing the vibration of the rotor assembly.

BRIEF DESCRIPTION OF THE DRAWINGS

Other objects, features and advantages of the present invention will become clear upon reviewing the following description of preferred embodiments thereof, made with reference to the accompanying drawings, in which.

DETAILED DESCRIPTION OF THE PREFERRED EMBODIMENTS

Figure 1:
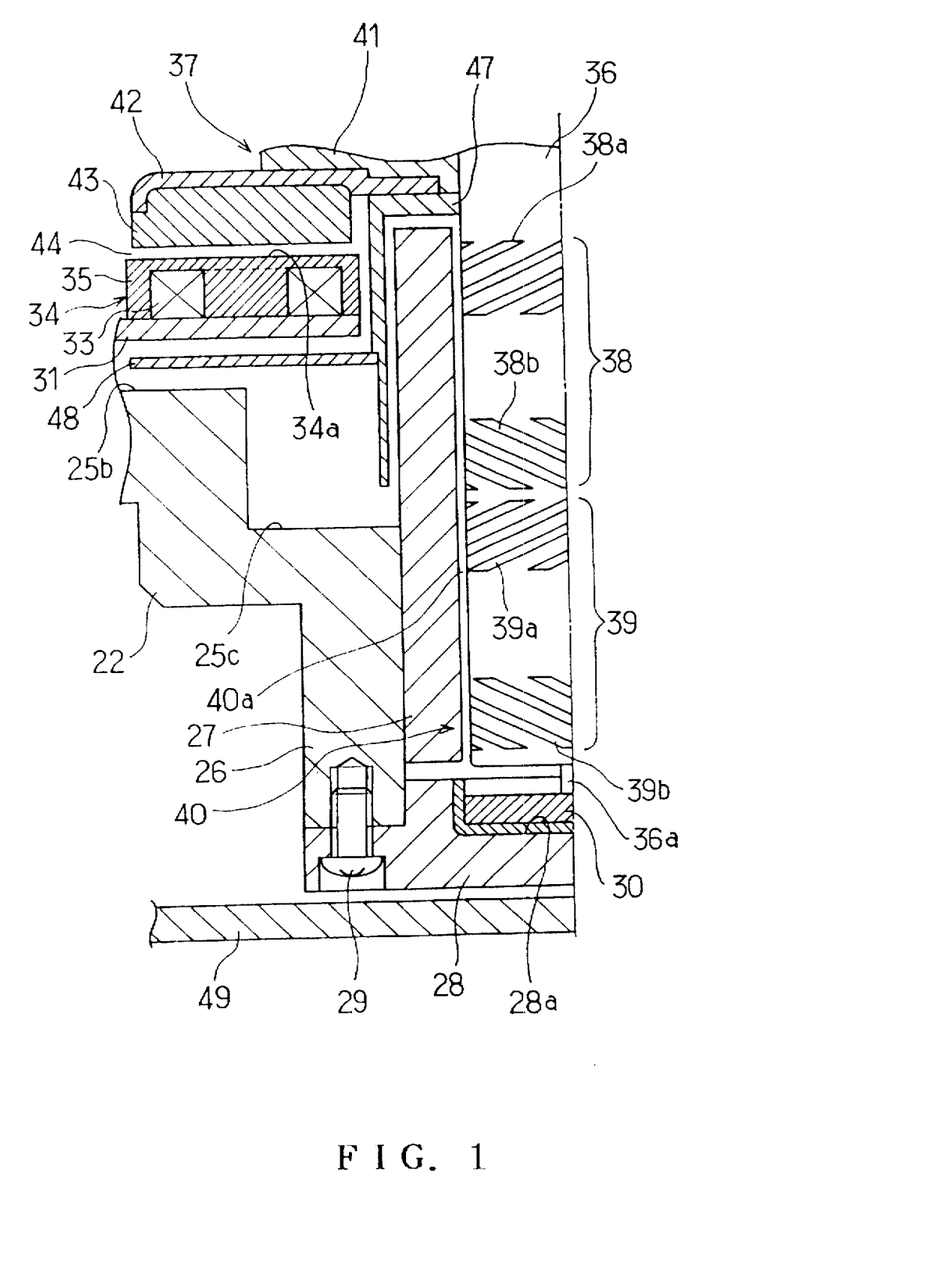
FIG. 1 is a partial enlarged longitudinal section of an axial gap type electric motor of a first embodiment in accordance with the present invention.
Figure 2:
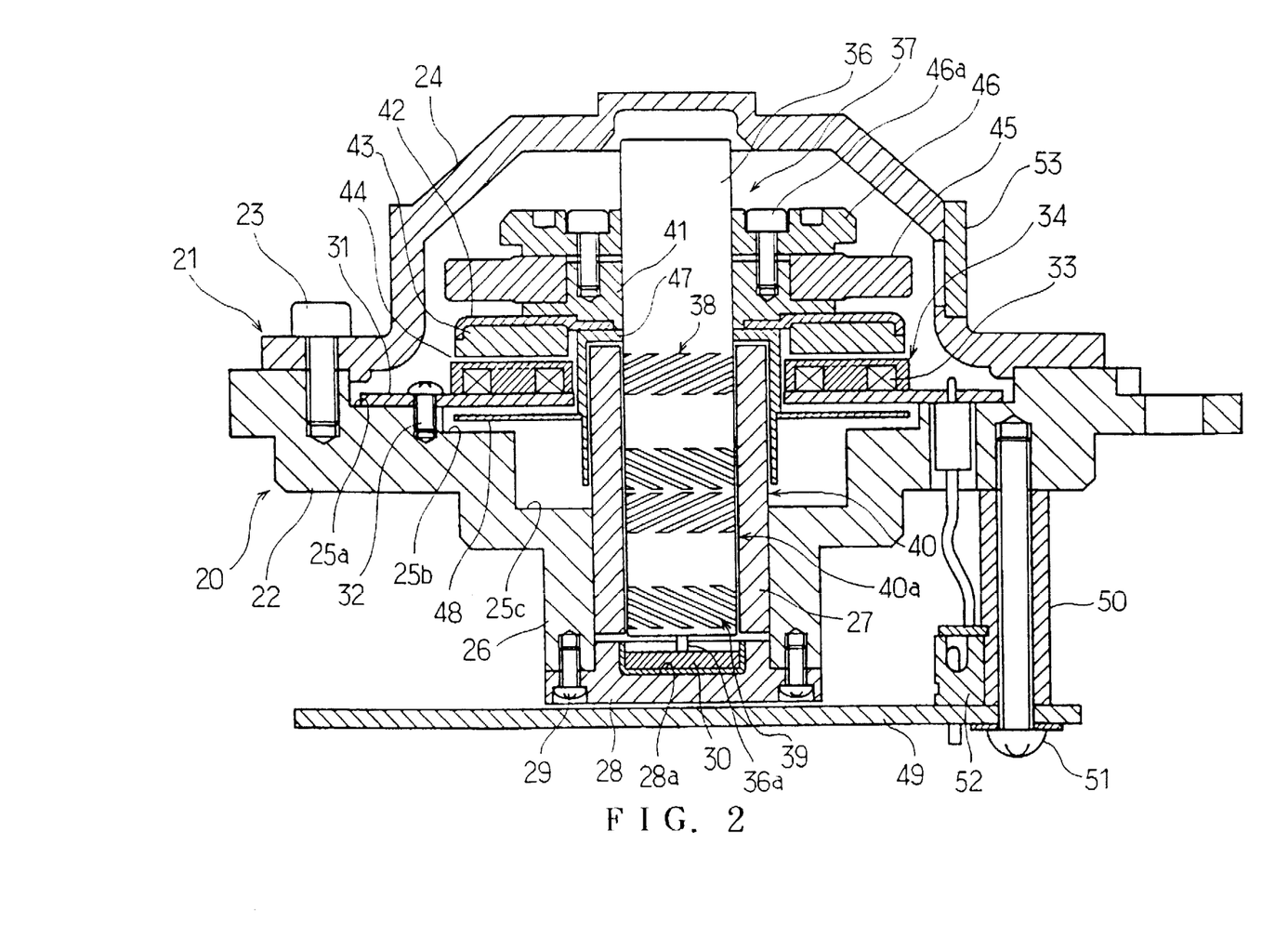
FIG. 2 is a longitudinal section of the overall motor.
Figure 3:
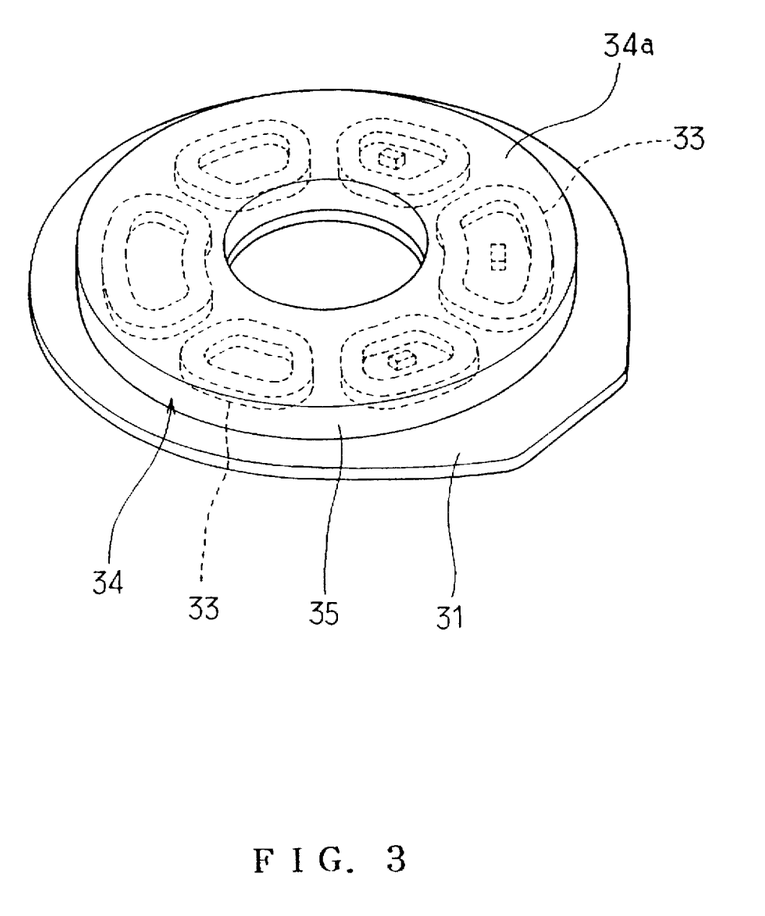
FIG. 3 is a perspective view of a block of stator coils employed in the motor.

A first embodiment of the present invention will be described with reference to FIGS. 1 to 3. One use of the axial gap type electric motor of the invention is as a scanner motor for driving a polygon mirror which is employed in a laser beam printer for scanning laser beams. Referring first to FIG. 2, an overall constitution of the motor is shown. A motor casing 21 including a stator assembly 20 comprises a base 22 and a cover 24 fixed by screws 23 (one of them being shown) to the upper portion of the base 22, so that the enclosed motor casing 21 is provided.

The base 22 has three stepped portions 25a, 25b and 25c on its upper side and a cylindrical portion 26 formed on the central bottom. A bearing cylinder 27 made of ceramic is inserted in the cylindrical portion 26 to be fixed therein by an adhesive agent. A bottom lid 28 is fixed to the lower open end of the cylindrical portion 26 by screws 29, thereby closing the end. The bottom lid 28 has a concavity 28a which is open to the interior of the cylindrical portion 26. A sliding thrust receiving member 30 made of ceramic is provided in the concavity 28a. The sliding thrust receiving member 30 constitutes thrust bearing means.

An electric circuit board 31 such as a printed circuit board is fixed to the upper stepped portion 25a of the base 22 by screws 32. An annular single block 34 of a plurality of stator coils 33 is fixed to the upper face of the circuit board 31. In the manufacture of the block 34, the plurality of stator coils 33 are fixed to the upper face of the circuit board 31 by an adhesive agent. Thereafter, the stator coils 33 are enclosed in a molding material 35 composed of a nonmagnetic synthetic resin with a forming die (not shown) so that the stator coils 33 are formed into a single block, as shown in FIG. 3. Irregularities of the stator coils 33 are eliminated in the block 34, so that the block 34 has an upper face rendered flat. The molding material 35 is preferably any one of the same material as that of the circuit board 31, a material having the same thermal expansion coefficient as the circuit board 31, and a material superior in heat resistance.

A rotor assembly 37 including a rotational shaft 36 is rotatably mounted in the motor casing 22. The shaft 36 is made of a hardened stainless steel, for example, and rotatably inserted in the bearing cylinder 27. The shaft 36 has two pairs of vertically disposed herringbone grooves 38 and 39 formed in an outer circumferential face thereof. The bearing cylinder 27 and the rotational shaft 36 constitute dynamic pressure air bearing means 40 in which air serves as a lubricating fluid. A bearing gap 40a which is about several micrometers wide is defined between the inner circumferential face of the bearing cylinder 27 and the outer circumferential face of the rotational shaft 36. The paired grooves 38 and 39 include upper or first grooves 38a and 39a and lower or second grooves 38b and 39b respectively. The direction of inclination of the first grooves 38a and 39a are opposite to that of the second grooves 38b and 39b. The rotational shaft 36 has on the lower end a convexity 36a at which the shaft 36 is held on the sliding thrust receiving member 30, so that a thrust load of the rotor assembly 37 is received via the shaft 36 by the sliding thrust receiving member 30.

An annular flange 41 is mounted to the upper circumferential face of the rotational shaft 36. A rotor yoke 42 is fixed to the underside of the flange 41 by the adhesive agent. An annular rotor magnet 43 is fixed to the underside of the rotor yoke 42 by the adhesive agent. The rotor magnet 43 is disposed relative to the upper face 34a of the block 34 of the stator coils 33 so that a predetermined axial gap 44 is defined therebetween. A polygon mirror 45 for scanning laser beams in the laser beam printer is attached to the upper portion of the flange 41 by a mirror presser 46 and screws 46a so that the mirror is rotated together with the rotor assembly 37. A mounting member 47 is mounted to the backside of the flange 41 so as to be rotated with the rotational shaft 36. The mounting member 47 extends through a hole (not shown) of the circuit board 31 so as to cover the bearing cylinder 27 from above the same. A rotating yoke 48 is fixed to a lower portion of the mounting member 47 so as to be positioned under the circuit board 31 in parallel therewith. The rotating yoke 48 serves as a magnetically focusing yoke. The rotating yoke 48 is disposed to be opposite to the rotor magnet 43 with the circuit board 31 and the stator coils 33 being interposed therebetween so that magnetic fluxes generated by the rotor magnet 43 pass through the rotating yoke 48.

An electric circuit board 49 including a drive circuit (not shown) is fixed to the backside of the base 22 by a spacer 50 and a screw 51, as shown in FIG. 2. The electric circuit on the circuit board 49 is electrically connected via an electrical connector 52 to the electric circuit on the circuit board 31 disposed in the motor casing 21. The cover 24 has a window 53 which is disposed so as to correspond to the outer periphery of the polygon mirror 45. Laser beams are allowed to pass through the window 53.

The operation of the motor will now be described. Upon rotation of the rotor assembly 37, the action of the herringbone grooves 38 and 39 draws air into the bearing gap 40a between the bearing cylinder 27 and the rotational shaft 36, whereupon high dynamic pressure serving as dynamic air bearing is produced. The rotational shaft 36 is rotated without contact with the bearing cylinder 27 by the action of the established dynamic pressure air bearing. The thrust load of the rotor assembly 37 is received via the shaft 36 by the sliding thrust receiving member 30. Since the rotor assembly 37 includes the magnetically focusing rotating yoke 48 which receives the magnetic fluxes generated by the rotor magnet 43, magnetically attractive forces the rotor magnet 43 applies to the rotating yoke 48 do not increase the thrust load applied to the thrust receiving member 30.

The stator coils are formed into a single block, which has a flat surface 34a opposite to the rotor magnet 43. Accordingly, since the stator coils 33 have no irregularities which cause the turbulent flows of air during rotation of the rotor assembly 37, the air flowing between the rotor magnet 43 and the stator coils 33 can be rendered laminar. Consequently, the windage loss can be reduced.

According to the above-described axial gap type motor, the stator coils 33 are formed into a single block, which has no irregularities. Consequently, the windage loss caused between the rotor magnet 43 and the stator coils 33 can be reduced.

The above-described reduction in the windage loss reduces a rating input current of the motor, whereby the rise in the motor temperature can be restrained. With this, the motor characteristics such as the motor speed variation and the bearing characteristics such as the shaft deflection can be improved, whereby a high precision motor can be provided.

Furthermore, the molding material 35 used for forming the block 34 is any one of the same material as that of the circuit board 31, a material having the same thermal expansion coefficient as the circuit board 31, and a material superior in heat resistance. Consequently, the upper face 34a of the block 34 can be prevented from being deformed.

Figures 4A, 4B, 4C, 4D:
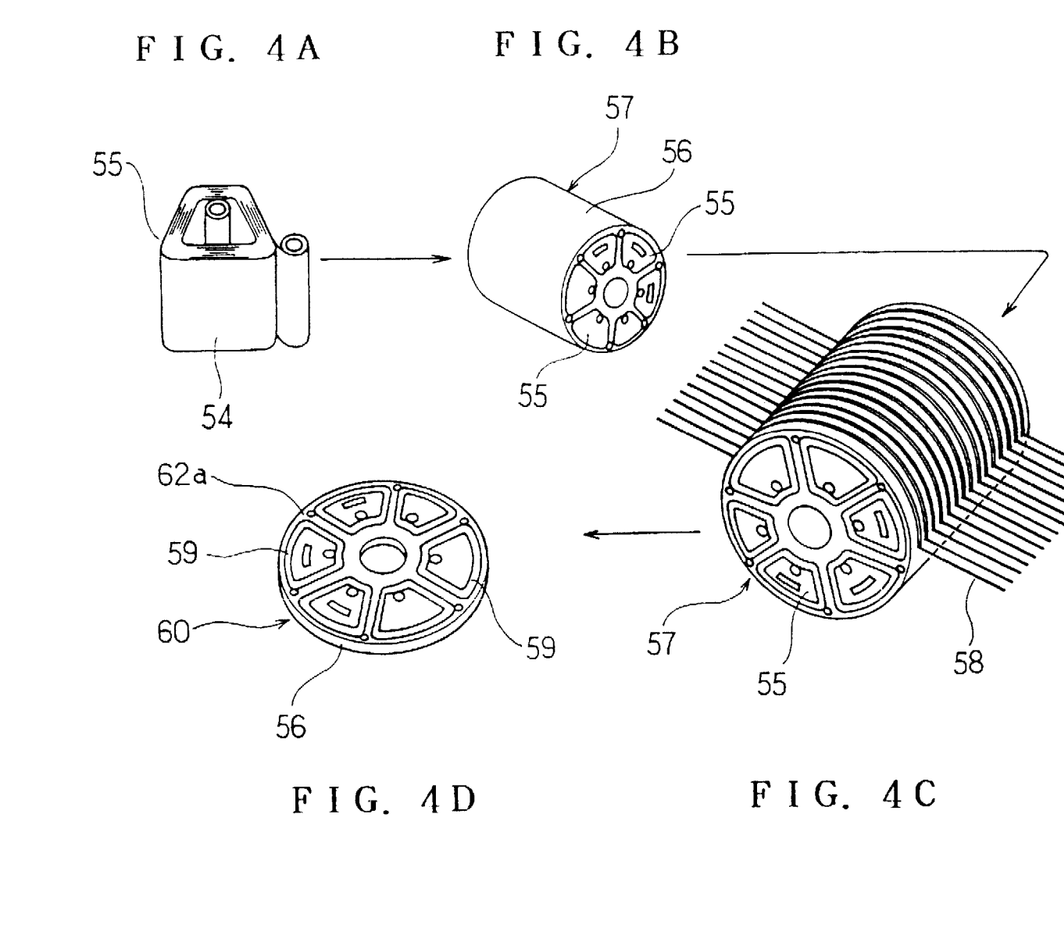
FIGS. 4A to 4D illustrate a manufacturing process of the block of stator coils employed in an axial gap type electric motor of a second embodiment in accordance with the present invention.

The block 34 of stator coils 33 may be formed in a process as in FIGS. 4A to 4D showing a second embodiment of the invention. A copper foil 54 to which an insulating adhesive agent is applied is wound into a copper coil 55 as shown in FIG. 4A. A plurality of such copper coils 55 are annularly disposed in a forming die (not shown) together with a molding material 56 so that each coil 55 is molded into a columnar shape. The molding material 56 is the same as the material 35 in the first embodiment. Consequently, the outer circumference of the copper foil coil 55 is covered by the molding material 56 and a solid column 57 as shown in FIG. 4B is obtained. Thereafter, the column 57 is cut with piano wires 58 into pieces each of which has a predetermined thickness as shown in FIG. 4C, whereupon an annular block 60 including a plurality of stator coils 59 enclosed in the molding material 56 is manufactured as shown in FIG. 4D.

The block 60 manufactured as described above is placed on the circuit board 31. Then, after electrical connection necessary for the block 60 is made, the block 60 is fixed to the circuit board 31 by an adhesive agent. The upper face 60a of the block 60 opposed to the rotor magnet 43 is rendered flat as in the first embodiment.

According to the second embodiment, the following advantage can be obtained in addition to the effects achieved in the first embodiment. That is, since a number of blocks 60 of stator coils 59 can be manufactured at once, processing and assembly of the blocks 60 can be rendered easier with the result of reduction in the manufacturing cost.

Figure 5:
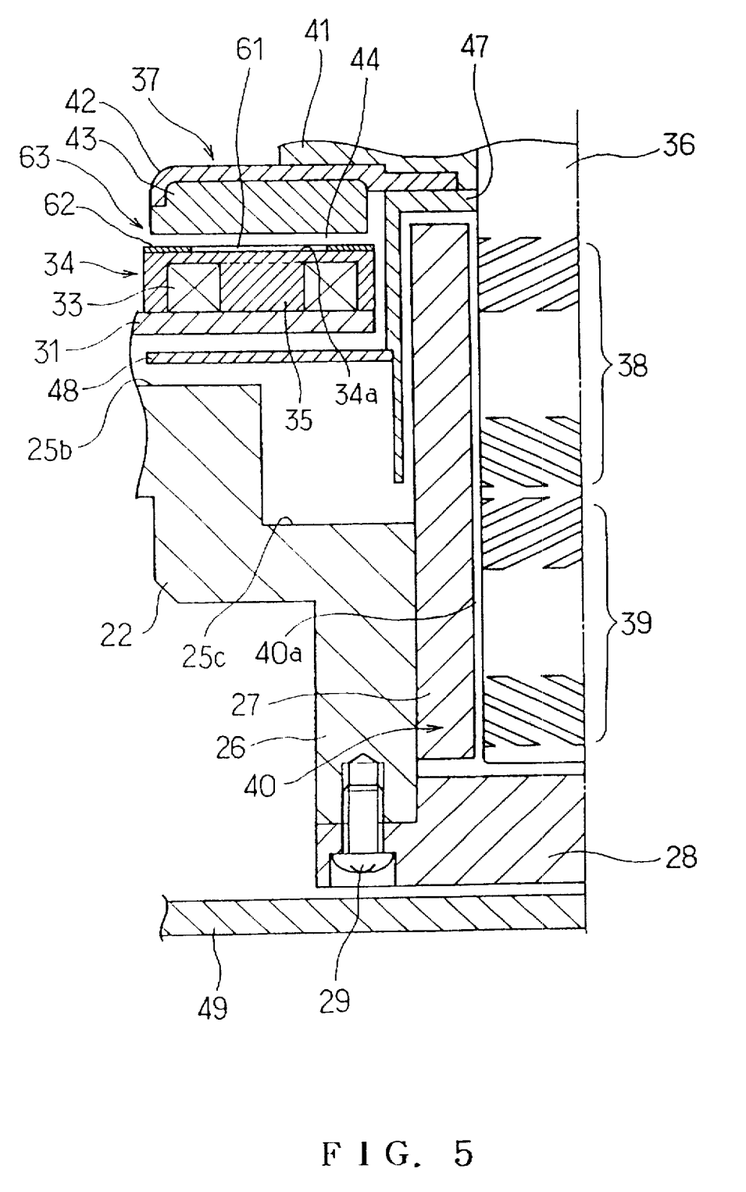
FIG. 5 is a view similar to FIG. 1, showing an axial gap type electric motor of a third embodiment in accordance with the present invention.
Figure 6:
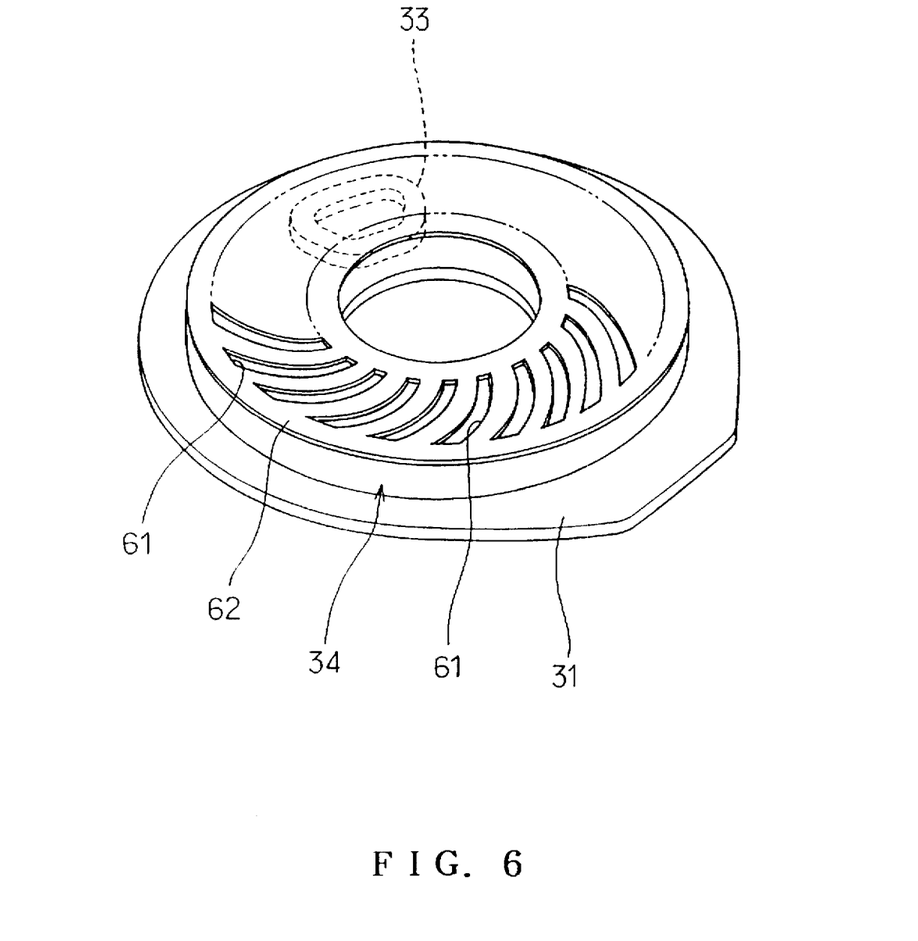
FIG. 6 is a perspective view of the block of stator coils in the third embodiment.

FIGS. 5 and 6 illustrate a third embodiment of the invention. The differences between the first and the third embodiments will be described. A sheet-like dynamic pressure thrust receiving member 62 is bonded to the upper face 34a of the block 34. The thrust receiving member 62 has on the surface thereof a number of spiral grooves 61 for the dynamic pressure air bearing. The spiral grooves 61 are opposed to the underside of the rotor magnet 43. The dynamic pressure thrust receiving member 62 and the rotor magnet 43 constitute thrust bearing means of the dynamic pressure air bearing type. Accordingly, the sliding thrust receiving member 30 and the convexity 36a of the rotational shaft 36 both employed in the first embodiment are eliminated in the third embodiment.

Upon rotation of the rotor assembly 37, a dynamic pressure air bearing is formed between the rotating rotor magnet 43 and the fixed dynamic pressure thrust receiving member 61. Consequently, the rotor assembly 37 is rotated without contact of the lower end of the shaft 36 thereof with the bottom lid 28 of the stator assembly 20 as well as without contact of the rotational shaft 36 with the bearing cylinder 27.

According to the third embodiment, the following advantage can be obtained in addition to the effects achieved in the first embodiment. That is, since the dynamic pressure air bearing structure is employed as the thrust bearing means 63, the life of the thrust bearing can be improved as compared with the case where a sliding bearing structure is employed.

The block 60 of the stator coils 59 employed in the second embodiment may be used in the motor of the third embodiment instead of the block 34.

Figure 7:
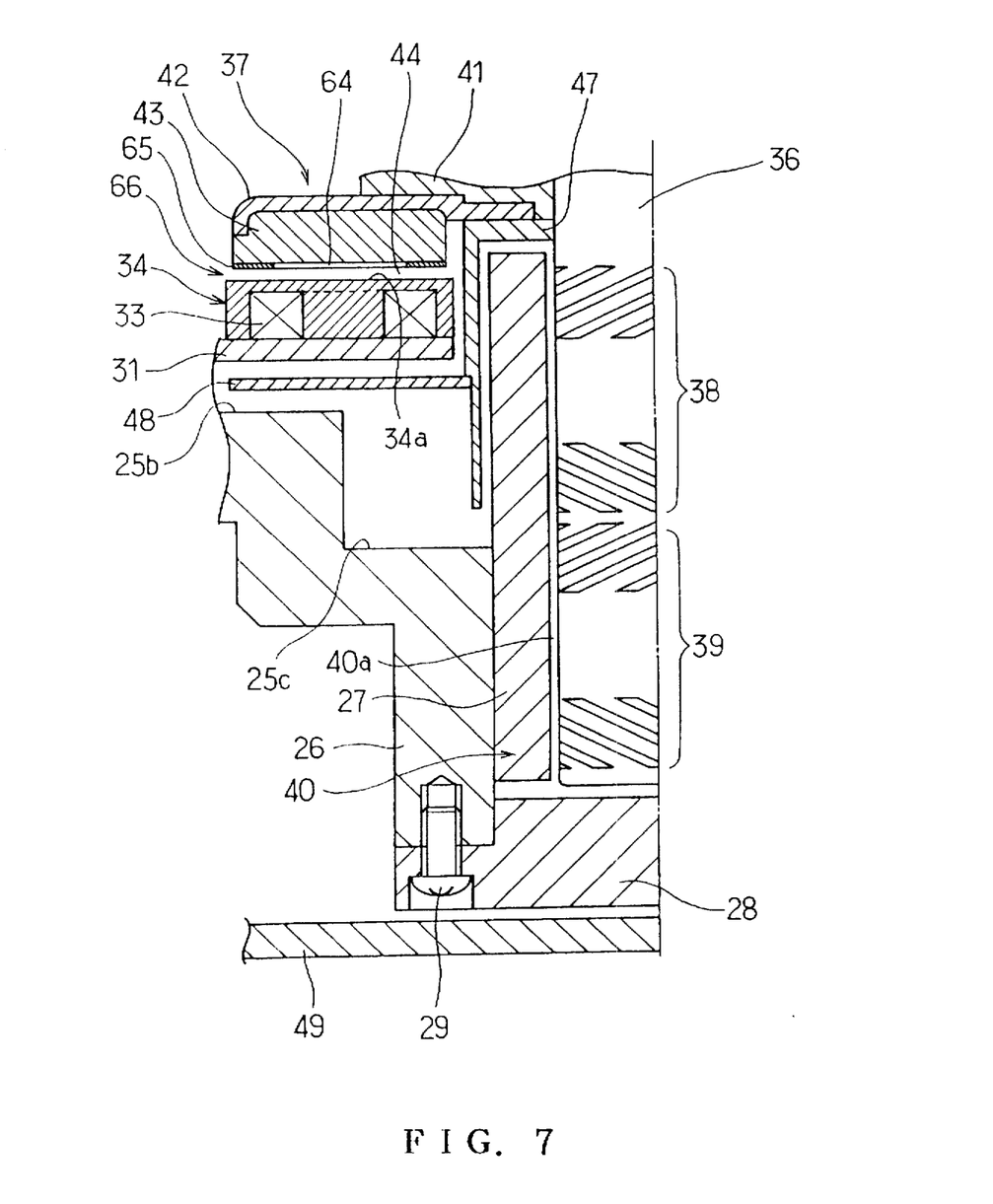
FIG. 7 is a view similar to FIG. 1, showing an axial gap type electric motor of a fourth embodiment in accordance with the present invention.
Figure 8:
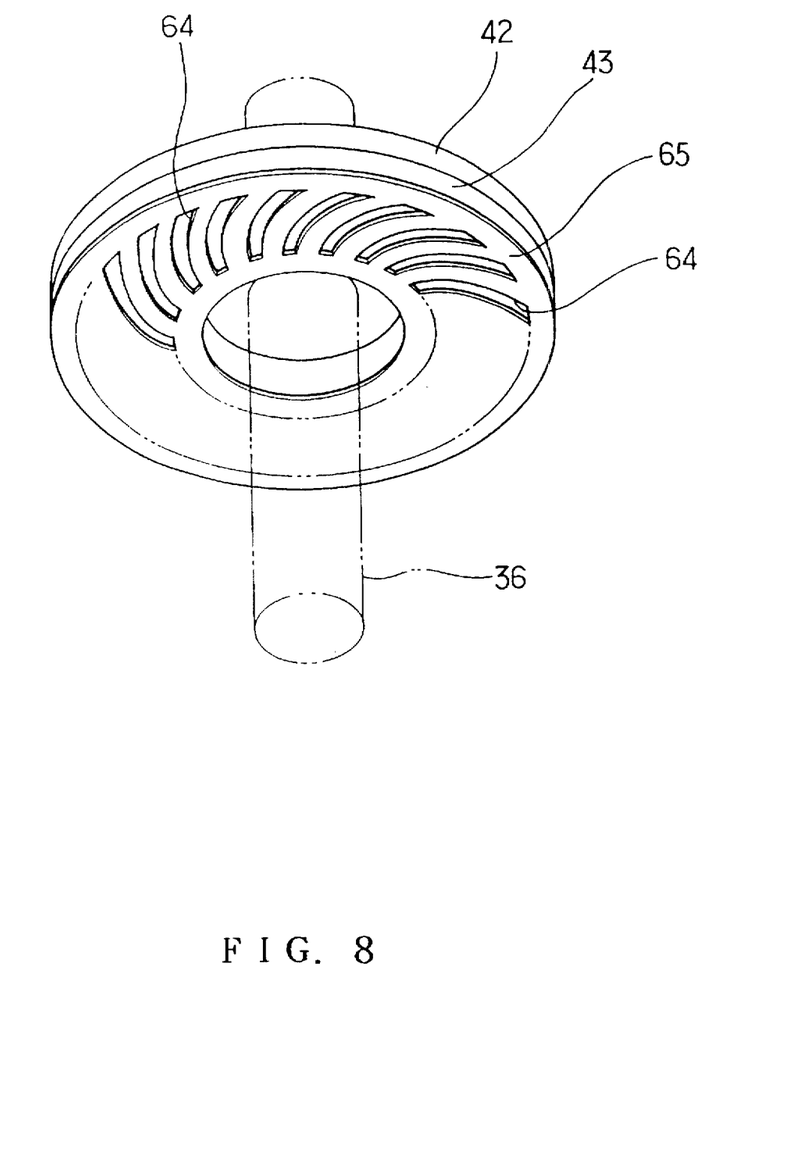
FIG. 8 is a perspective view of a rotor magnet employed in the motor of the fourth embodiment.

FIGS. 7 and 8 illustrate a fourth embodiment of the invention. The differences between the third and the fourth embodiments will be described. A sheet-like dynamic pressure thrust receiving member 65 is bonded to the underside of the rotor magnet 43. The thrust receiving member 65 has on the surface thereof a number of spiral grooves 64 for the dynamic pressure air bearing. The spiral grooves 64 are opposed to the upper face 34a of the block 34. The dynamic pressure thrust receiving member 65 and the block 34 constitute thrust bearing means 66 of the dynamic pressure air bearing type.

The same effect as in the third embodiment can be achieved in the fourth embodiment. The block 60 of the stator coils 59 employed in the second embodiment may be used in the motor of the fourth embodiment instead of the block 34.

Figure 9:
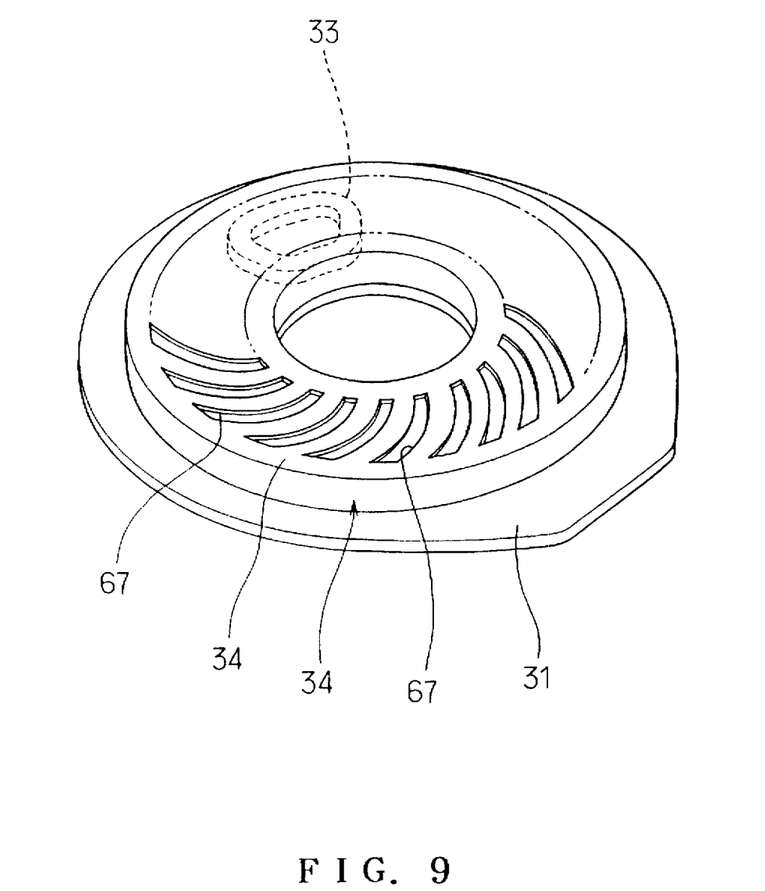
FIG. 9 is a perspective view of a block of stator coils employed in an axial gap type electric motor of a fifth embodiment in accordance with the present invention.

FIG. 9 illustrates a fifth embodiment of the invention. The differences between the third and the fifth embodiments will be described. A number of spiral grooves 67 for the dynamic pressure air bearing are directly formed on the upper face 34a of the block 34 without the dynamic pressure thrust receiving member 62 which is employed in the third embodiment. The spiral grooves 67 are opposed to the underside of the rotor magnet 43. The block 34 and the rotor magnet 43 constitute thrust bearing means of the dynamic pressure air bearing type.

The spiral grooves 67 may be formed on the upper face 34a of the block 34 by printing means, for example. In such a case, the block 34 may also serve as a resistive layer on an end face of each stator coil 33.

Figure 10:
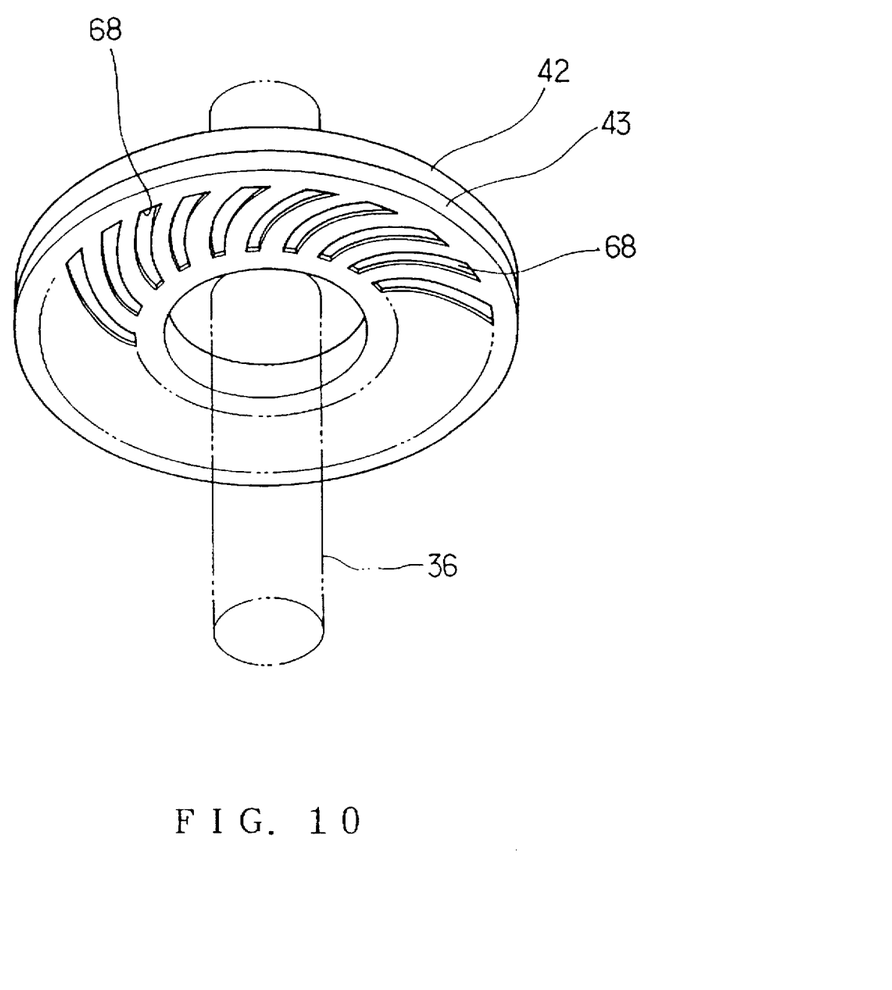
FIG. 10 is a perspective view of a rotor magnet employed in an axial gap type electric motor of a sixth embodiment in accordance with the present invention.

FIG. 10 illustrates a sixth embodiment of the invention. The differences between the fourth and the sixth embodiments will be described. A number of spiral grooves 68 for the dynamic pressure air bearing are directly formed on the underside of the rotor magnet 43 without use of the dynamic pressure thrust receiving member 65 which is employed in the fourth embodiment. The spiral grooves 68 are opposed to the upper face 34a of the block 34. The block 34 and the rotor magnet 43 constitute thrust bearing means of the dynamic pressure air bearing type.

Figure 11:
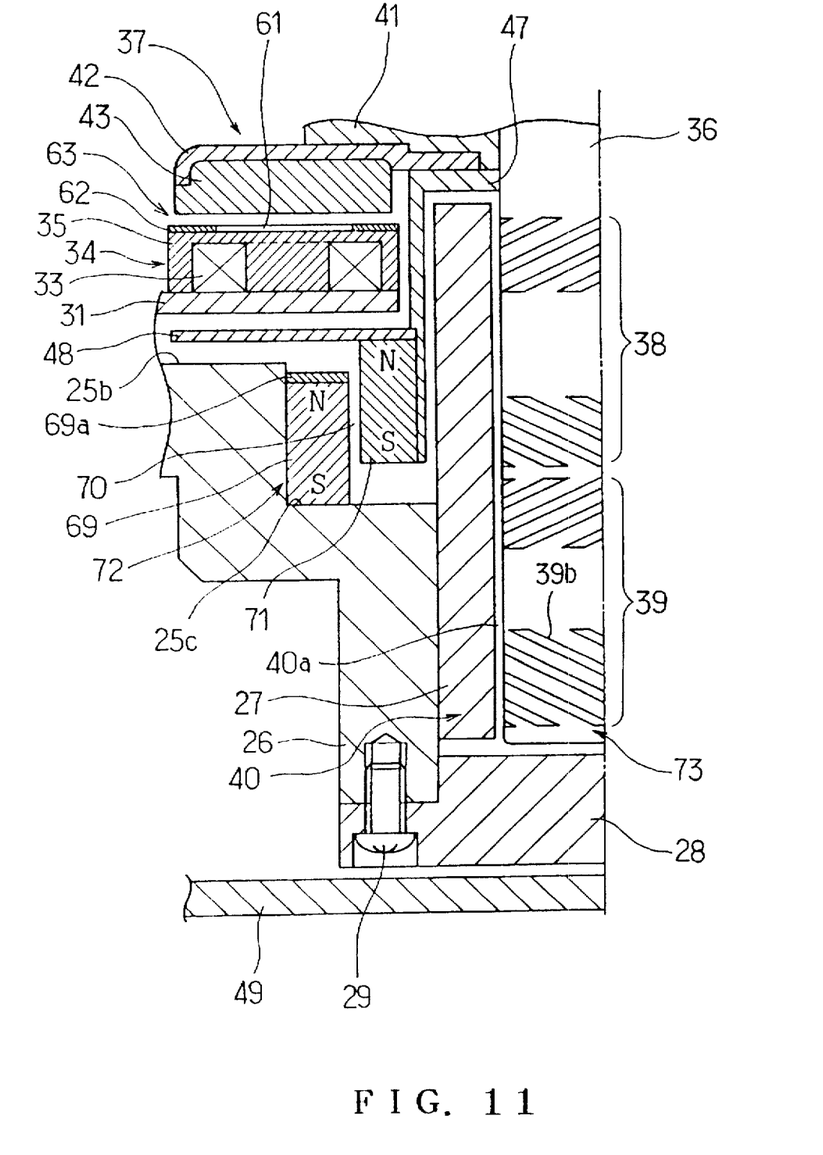
FIG. 11 is a view similar to FIG. 1, showing an axial gap type electric motor of a seventh embodiment in accordance with the present invention.
Figure 12:
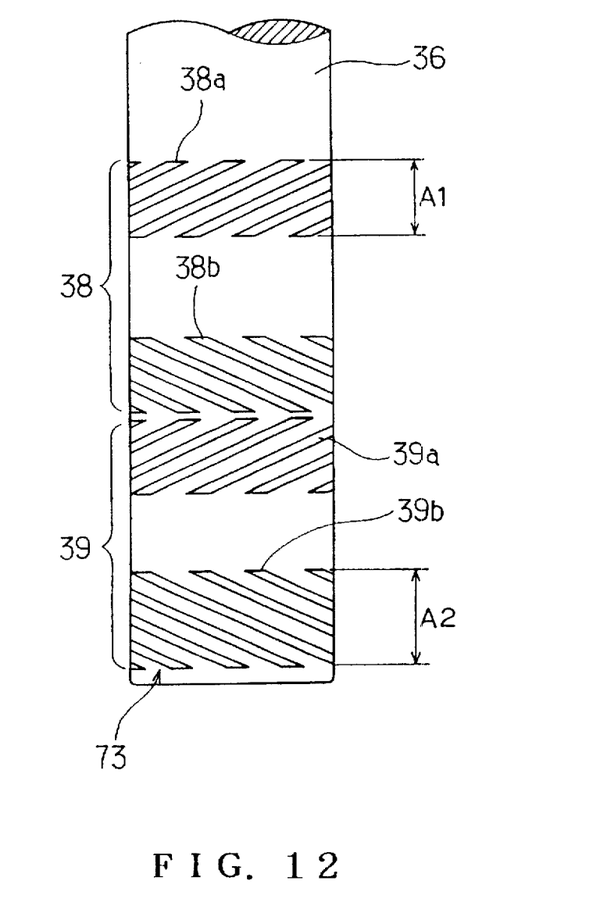
FIG. 12 is an enlarged side view of a rotational shaft of a rotor assembly employed in the motor of the seventh embodiment.

FIGS. 11 and 12 illustrate a seventh embodiment of the invention. The differences between the third and the seventh embodiments will be described. An annular magnet 69 is fixed to the lower stepped portion 25c of the base 22 for the purpose of magnetic levitation at the stator side. A magnetically focusing yoke 69a is fixed to the top of the magnetically levitating magnet 69. An annular, rotor side magnetically levitating magnet 71 is also fixed to the lower portion of the mounting member 47 with a gap 70 between the outer circumference thereof and the inner circumference of the magnet 69. The magnets 69 and 71 constitute magnetically levitating means 72 for magnetically levitating the rotor assembly 37 by magnetically repulsive forces between them. Each of the magnets 69 and 71 is magnetized so as to have the north pole at the upper end and the south pole at the lower end, as viewed in FIG. 11.

The first and second grooves 38a and 38b of the upper pair 38 of herringbone grooves formed in the outer circumference of the shaft 36 and the first groove 39a of the pair 39 of herringbone grooves have the same axial dimension or width A1, as shown in FIG. 12. An axial dimension or width A2 of the second groove 39b of the lower pair 39 is set to be larger than the dimension A1 of the other grooves 38a, 38b and 39a. Thus, the two paired herringbone grooves 38 and 39 constitute descending force generating means 73 for generating a thrust descending the rotor assembly 37 toward the base 22 during rotation thereof.

The rotor assembly 37 is levitated by the action of the magnetically levitating means 72 slightly higher (0.2 to 1.0 mm) during stop of the motor than during rotation of the rotor assembly, so that the rotor magnet 43 of the rotor assembly 37 is out of contact with the dynamic pressure thrust receiving member 62 of the stator assembly 20. Upon rotation of the rotor assembly 37, the descending force generated by the descending force generating means 73 reduces an amount of levitation thereof with the increase in the motor speed. The amount of levitation of the rotor assembly 37 reaches a predetermined value (several micrometers to several tens micrometers) when a predetermined motor speed is reached. Consequently, an axial dynamic pressure air bearing is established by the thrust bearing means 63 which is constituted by the dynamic pressure thrust receiving member 62 and the rotor magnet 43. Since axial vibration of the rotor assembly 37 is restrained, a stable rotation can be achieved. Furthermore, a radial dynamic pressure air bearing is also established between the bearing cylinder 27 and the shaft 36 during rotation of the rotor assembly 37, so that the rotor assembly 37 is rotated without its contact with the stator assembly in the radial direction.

The descending force of the descending force generating means 73 is reduced with drop of the motor speed. When the rotation of the rotor assembly 37 is stopped, the rotor assembly 37 is levitated by the action of the magnetically levitating means 72 slightly higher (0.2 to 1.0 mm) during stop of the motor than during rotation of the rotor assembly.

When the thrust bearing means is constituted only by the dynamic pressure air bearing comprising the thrust bearing means 63 as in the third embodiment, the rotor magnet 43 is in contact with the dynamic pressure thrust receiving member 62 during stop of the motor. The dynamic pressure air bearing comprising the thrust bearing means 63 levitates the rotor magnet 43 of the rotor assembly 37 relative to the dynamic pressure thrust receiving member 62 only when the rotational speed of the rotor assembly 37 reaches a predetermined value or above, whereupon the dynamic pressure air bearing is established in the condition that the rotor magnet 43 is out of contact with the thrust receiving member 62. Strictly speaking, the rotor magnet 43 is in contact with the thrust receiving member 62 when the rotational speed of the rotor assembly 37 is below the predetermined value during stop and starting of the motor. Accordingly, the dynamic pressure air bearing comprising the thrust bearing means 63 serves as a sliding bearing.

In the above-described seventh embodiment, however, the magnetically levitating means 72 is provided in addition to the thrust bearing means 63, so that the rotor magnet 43 of the rotor assembly 37 is levitated relative to the thrust receiving member 62 so as to be normally maintained in the noncontact state. Additionally, as the result of provision of the descending force generating means 73, the axial vibration of the rotor assembly 37 can be restrained during rotation thereof, whereby a stable rotation can be achieved.

The above-described magnetically levitating means 72 and the descending force generating means 73 may be provided in the motors of the fourth to sixth embodiments. Furthermore, the paired herringbone grooves 38 and 39 constituting the radial dynamic pressure air bearing means may be formed on the inner circumference of the bearing cylinder 27, instead of the outer circumference of the shaft 36.

The foregoing description and drawings are merely illustrative of the principles of the present invention and are not to be construed in a limiting sense. Various changes and modifications will become apparent to those of ordinary skill in the art. All such changes and modifications are seen to fall within the true spirit and scope of the invention as defined by the appended claims.

I claim:

1. An axial gap type electric motor comprising:

a stator assembly including a base having a bearing cylinder, an electric circuit board fixed to the base, and a plurality of stator coils annularly disposed on the circuit board;

a rotor assembly including a shaft rotatably inserted in and held by the bearing cylinder, a rotor magnet provided on the shaft so as to be opposite to the stator coils with an axial gap therebetween, and a magnetic focusing rotatable yoke provided so as to rotate with the shaft, the yoke being disposed so as to be opposite to the rotor magnet with the circuit board with the stator coils being located therebetween;

a dynamic pressure gas bearing arrangement provided between an outer circumferential face of the shaft and an inner circumferential face of the bearing cylinder;

a thrust bearing arrangement for receiving thrust load of the rotor assembly; and a magnetically levitating arrangement comprising an annular, stator side magnetically levitating magnet provided on the stator assembly and an annular, rotor side magnetically levitating magnet which is provided on the rotor assembly so as to be opposed to an inner or outer circumference of the stator side magnetically levitating magnet with a predetermined gap therebetween, the magnetically levitating arrangement axially levitating the rotor assembly by a magnetic force between the stator and rotor side magnetically levitating magnets;

wherein the annularly disposed stator coils are enclosed in a nonmagnetic molding material so that a single annular block conforming in configuration to the annularly disposed stator coils is formed, the annular block having a surface which is opposite to the rotor magnet and which is rendered flat substantially over an entire area thereof such that the surface is prevented from being circumferentially rugged, the annular block being fixed to the circuit board so as to project from a surface thereof;

wherein the dynamic pressure gas bearing arrangement includes two herringbone grooves formed in an outer circumferential face of the shaft; and wherein one of the herringbone grooves has an axial dimension larger than the other herringbone groove so that during rotation of the rotor assembly, a force is generated which descends the rotor assembly toward the side of the stator assembly.

2. An axial gap type electric motor comprising:

a stator assembly including a base having a bearing cylinder, an electric circuit board fixed to the base, and a plurality of stator coils annularly disposed on the circuit board;

a rotor assembly including a shaft rotatably inserted in and held by the bearing cylinder, a rotor magnet provided on the shaft so as to be opposite to the stator coils with an axial gap therebetween, and a magnetic focusing rotating yoke provided so as to rotate with the shaft, the yoke being disposed so as to be opposite to the rotor magnet with the circuit board with the stator coils being located therebetween;

a dynamic pressure gas bearing arrangement provided between an outer circumferential face of the shaft and an inner circumferential face of the bearing cylinder;

a thrust bearing arrangement for receiving thrust load of the rotor assembly; and a magnetically levitating arrangement comprising an annular, stator side magnetically levitating magnet provided on the stator assembly and an annular, rotor side magnetically levitating magnet which is provided on the rotor assembly so as to be opposed to an inner or outer circumference of the stator side magnetically levitating magnet with a predetermined gap therebetween, the magnetically levitating arrangement axially levitating the rotor assembly by a magnetic force between the stator and rotor side magnetically levitating magnets;

wherein the annularly disposed stator coils are enclosed in a nonmagnetic molding material so that a single annular block conforming in configuration to the annularly disposed stator coils is formed, the annular block having a surface which is opposite to the rotor magnet and which is rendered flat substantially over an entire area thereof such that the surface is prevented from being circumferentially rugged, the annular block being fixed to the circuit board so as to project from a surface thereof; and wherein the yoke has a face opposed to the rotor magnet, the face being formed with a spiral groove for the purpose of dynamic pressure gas bearing so that during rotation of the rotor assembly a thrust is generated which descends the rotor assembly toward the side of the stator assembly.

3. A motor according to claim 1, wherein the shaft has an end configured so as to be connectable to a polygon mirror so that a connected mirror will be rotated therewith.

4. A motor according to any one of claims 2, wherein the rotational shaft has an end configured so as to be connectable to a polygon mirror so that a polygon mirror connected thereto will be rotated with the rotational shaft.

* * * * *